US012006186B2

(12) United States Patent
Beard

(10) Patent No.: US 12,006,186 B2
(45) Date of Patent: Jun. 11, 2024

(54) ARTICULABLE LIFTING ATTACHMENT

(71) Applicant: TW DEAN GROUP LIMITED, Dartford (GB)

(72) Inventor: Neil James Beard, Tewkesbury (GB)

(73) Assignee: TW DEAN GROUP LIMITED, Dartford (GB)

( * ) Notice: Subject to any disclaimer, the term of this patent is extended or adjusted under 35 U.S.C. 154(b) by 856 days.

(21) Appl. No.: 16/972,661

(22) PCT Filed: Jun. 7, 2019

(86) PCT No.: PCT/GB2019/051598
§ 371 (c)(1),
(2) Date: Dec. 7, 2020

(87) PCT Pub. No.: WO2019/234452
PCT Pub. Date: Dec. 12, 2019

(65) Prior Publication Data
US 2021/0246000 A1 Aug. 12, 2021

(30) Foreign Application Priority Data
Jun. 7, 2018 (GB) ..................................... 1809398

(51) Int. Cl.
*B66C 1/44* (2006.01)
*B66C 1/68* (2006.01)

(52) U.S. Cl.
CPC ................ *B66C 1/445* (2013.01); *B66C 1/68* (2013.01); *B66C 1/447* (2013.01)

(58) Field of Classification Search
CPC ............ B66C 1/445; B66C 1/447; B66C 1/68
USPC ................................................ 294/86.4, 201
See application file for complete search history.

(56) References Cited

U.S. PATENT DOCUMENTS

| | | | | |
|---|---|---|---|---|
| 5,386,746 | A * | 2/1995 | Hauk | E21B 19/163 81/57.36 |
| 7,114,234 | B2 * | 10/2006 | Penman | E21B 19/168 29/464 |
| 8,490,519 | B2 * | 7/2013 | Lavalley | B66C 1/68 81/57.35 |
| 9,073,732 | B2 * | 7/2015 | LaValley | B66C 1/44 |
| 9,702,207 | B2 * | 7/2017 | Randall, Jr. | E21B 19/16 |
| 10,144,619 | B2 * | 12/2018 | LaValley | B66C 1/02 |
| 11,236,558 | B2 * | 2/2022 | LaValley | E21B 19/163 |
| 11,480,019 | B2 * | 10/2022 | Lavalley | E21B 19/161 |
| 2011/0252926 | A1 * | 10/2011 | Eglin | E21B 19/164 81/57.35 |

(Continued)

FOREIGN PATENT DOCUMENTS

| | | |
|---|---|---|
| EP | 1679462 | 7/2006 |
| EP | 2050698 | 4/2009 |
| JP | H04327492 | 11/1992 |

(Continued)

*Primary Examiner* — Paul T Chin
(74) *Attorney, Agent, or Firm* — ALLEN, DYER ET AL.

(57) ABSTRACT

An articulable lifting attachment is provided for a mechanical articulated arm. The articulable lifting attachment comprises an attachment body, a clamping head and a drivable articulator coupling interposed between the attachment body and the clamping head. The clamping head is configured to provide two different clamping forces from different directions to ensure that irregular objects can be lifted safely.

16 Claims, 8 Drawing Sheets

(56) References Cited

U.S. PATENT DOCUMENTS

2015/0082598 A1 3/2015 Lavalley et al.

FOREIGN PATENT DOCUMENTS

| | | |
|---|---|---|
| JP | H0761763 | 3/1995 |
| JP | H0860876 | 3/1996 |
| KR | 20170106610 | 9/2017 |
| WO | WO2005123564 | 12/2005 |

* cited by examiner

ARTICULABLE LIFTING ATTACHMENT

RELATED APPLICATION

This application is based on prior filed copending International Application No. PCT/GB2019/051598 filed Jun. 7, 2019, which claims priority to Great Britain Application No. 1809398.9, filed Jun. 7, 2018, the entire subject matter of these applications is incorporated herein by reference in its entirety.

TECHNICAL FIELD

The present invention relates to an articulable lifting attachment which is preferably but not necessarily exclusively suitable for demountable engagement with a mechanical articulated arm. A mechanised vehicle having such an attachment is also provided, as is a method of lifting an object using the attachment.

BACKGROUND

In construction projects, it is often required to lift, and often precisely handle and position, heavy objects, such as steel or concrete building components, which can only be lifted using heavy machinery. One of the main difficulties is therefore in being able to apply a suitable clamping or gripping force to the object to be lifted. It is relatively simple to create a single machine having a gripping head which is bespoke to a specific object to be lifted; however, such a machine will not likely be suitable for multiple applications.

For lifting cuboidal or substantially cuboidal objects, the most common machine is provided as a liftable vice-like attachment for mechanical articulated arms. This allows for gripping parallel planar surfaces of the object, and high clamping forces can be achieved. This is common for, for example, the lifting of steel beams into upright configurations. Such attachments require an articulated portion to permit rotation and alignment of the beam once clamped.

For lifting other objects, the preferred method is to use a cradle-like attachment which has clamping fingers which can hook underneath the object. Most commonly, this arrangement is used for cylindrical objects such as pipes. The pivotable jaws of the cradle can grasp the object, and the clamping fingers can effectively retain the object. The clamping forces of such attachments are typically less than for a vice-like attachment, as the clamping fingers must be perfectly matched to a shape of the object in order to secure it in position.

Such cradles are not suitable for holding irregularly shaped objects in elevated positions, since the clamping force will be insufficient to safely retain the object. As such, if a construction project requires lots of objects of differing sizes and shapes to be lifted into position, then many attachments of differing dimensions and clamping configuration must be provided. This can drastically increase the cost and speed of the relevant project as multiple attachments must be obtained and attached to a mechanised vehicle.

SUMMARY

The present invention seeks to provide an attachment which is able to clamp and retain objects of differing shapes and sizes in order to obviate the above-referenced problems.

According to a first aspect of the invention, there is provided an articulable lifting attachment for a mechanical articulated arm, the articulable lifting attachment comprising: an attachment body having a mechanical-articulated-arm connector; a clamping head having a primary clamping element and a secondary clamping element, the primary clamping element comprising a pair of clamping jaws for applying a first clamping force to an object to be lifted, the secondary clamping element being activatable to apply a second clamping force in a different direction relative to the first clamping force; and a drivable articulator coupling interposed between the attachment body and the clamping head to permit relative articulation between the attachment body and the clamping head.

The provision of an attachment having primary and secondary clamping elements, providing different directionalities of clamping forces, allows for objects having different shapes and/or sizes to be grasped by the clamping head. This significantly reduces the machinery requirements for a construction project having many different objects requiring lifting. The attachment allows for structures of varying sectional character to be manoeuvred and precisely positioned.

Preferably, the pair of clamping jaws may comprise a first arm having a first clamp portion and a second arm having a second clamp portion, the first and second clamp portions being actuatable relative to one another.

The provision of a preferably arcuate arm having a clamp portion at a distal end thereof provides a wide range of motion for the clamping jaws, ensuring that many different sizes and shapes of object are receivable therein.

Optionally, at least one of the first and second arms may be pivotably actuatable to effect the relative actuation of the first and second clamp portions.

A pincer-type motion can advantageously spread the clamping force across the first and second clamping portions more uniformly, reducing the risk of slippage during the lifting process.

In one embodiment, at least one of the first and second clamp portions may comprise a rotatable clamping pad.

By permitting the clamping pad to rotate relative to the arms, any slight inconsistencies in the shape of the object to be lifted can be readily accommodated, as the clamping pad rotates to a most appropriate clamping position.

The rotatable clamping pad may comprise a support portion aligned to an axis of rotation of the rotatable clamping pad and a gripping portion which is angled relative to the support portion.

It is preferred that there is a support portion which is able to provide a necessary clamping force to the object being clamped, whilst also providing a further gripping portion which is more suited to cupping or cradling the shape of the object to be lifted. Different clamping elements having different gripping portions may be provided which are suitable for different lifting tasks.

Preferably, each rotatable clamping pad may be attached to a respective first or second arm via an elongate member about which the rotatable clamping pad is rotatable.

An elongate member provides an extension which can space the object away from the drivable articulator coupling, ensuring that there is plenty of space into which larger objects can be received. This increases the utility of the attachment.

The attachment may further comprise a roller element at or adjacent to the rotatable clamping pad for aligning the clamping pad relative to the object to be lifted.

A roller element can act as a first contact point with the outer surface of the object to be lifted. As the clamping jaws close, the roller will urge the rotatable clamping pad into the correct alignment, thereby avoiding an inadequate clamping alignment which can sometimes result in using present systems.

A separation between each of the first and second clamp portions and the drivable articulator coupling may be adjustable.

The depth of the clamping head should be adjustable in order to accommodate objects of different depths; the closer the object can be positioned to the secondary clamping element, the likelier it will be that an effective clamping force can be realised.

Optionally, the first and second clamp portions may comprise a contact surface formed from a material having a higher coefficient of friction than the first and second arms.

Using a high-friction material, such as rubber, limits the possibility of the object to be lifted sliding out of the grip of the clamping head.

Preferably, at least one of the first and second clamp portions may be releasably engagable with the respective first and/or second arm.

The provision of releasably engagable clamping portions allows the articulable lifting attachment to be customised according to a task to be performed. This reduces the equipment needs for a complex lifting project.

In a preferable embodiment, two said pairs of clamping jaws may be provided.

Two pairs of clamping jaws provide an excellent clamping geometry, which allows for a powerful secondary clamping force to be applied without risking slippage of the clamped object.

The two pairs of clamping jaws may be operable in a jaw-operation plane.

Planar operation of the clamping jaws results in a more uniform clamping force being applied to the clamped object, improving the security of retention of the object.

In one embodiment, the two pairs of clamping jaws may be independently operable.

Independent operation of the clamping jaws advantageously allows for a strong clamping force to be applied to an irregularly-shaped object, for example, an object which is larger at one end than the other.

Preferably, the secondary clamping element may be configured to apply the clamping force in a direction perpendicular to the jaw-operation plane.

The application of a perpendicular clamping force from the secondary clamping element is likely to produce the strongest retention force applied against a gripping portion of the clamping pads, improving a security of a held object.

Preferably, the clamping head may provide five points of contact with the object to be lifted, the two pairs of clamping jaws providing four of the points of contact, and the secondary clamping element providing a further point of contact.

The five-point contact arrangement advantageously increases the security with which the object to be lifted will be held whilst being manipulated.

Optionally, the secondary clamping element may be provided as a drivable ram. The secondary clamping element may comprise a contact pad mounted at a distal end of the drivable ram.

A drivable ram is capable of providing a linearly actuatable clamping force in a compact configuration, thereby reducing a volume of the attachment.

The contact pad may be mounted to the distal end of the drivable ram via a hemispherical bearing.

The provision of the hemispherical bearing allows for some play in the positioning of the contact pad when contacting with the object to be lifted, further improving the ability for the attachment to lift irregularly shaped objects.

Preferably, the drivable articulator coupling may comprise an axial rotational connector engaged with the clamping head. Additionally, or alternatively, the drivable articulator coupling may comprise a tiltable connector engaged with the attachment body.

A full range of motion from the drivable articulator coupling is preferred, since this allows the operator to position the lifted object as required, which may often be a very unstable configuration until further securing is achieved.

The articulable lifting attachment may further comprise a hydraulic control assembly for controlling an operation of the primary and/or secondary clamping elements.

Hydraulic control of the clamping forces is a simple mechanism by which a strong clamping force can be applied and held according to the shape of the object to be clamped, since the hydraulic cylinders will act according to the hydraulic pressure applied until a resistance is met from the object to be lifted.

According to a second aspect of the invention, there is provided a mechanised vehicle having a mechanical articulated arm and an articulable lifting attachment in accordance with the first aspect of the invention attached to the mechanical articulated arm.

According to a third aspect of the invention, there is provided a method of lifting an object, the method comprising the steps of: a] engaging an articulable lifting attachment in accordance with the first aspect of the invention with the object; b] activating a driving mechanism to engage the primary and secondary clamping elements with the object such that a clamping force is applied in a plurality of different directions; and c] lifting the articulable lifting attachment to lift the object.

According to a fourth aspect of the invention, there is provided an articulable lifting attachment for a mechanical articulated arm, the articulable lifting attachment comprising: an attachment body having a mechanical-articulated-arm connector; a clamping head having a plurality of clamping element connectors; a drivable articulator coupling interposed between the attachment body and the clamping head to permit relative articulation between the attachment body and the clamping head; and a plurality of sets of clamping elements, wherein each set of clamping element is releasably engagable with the plurality of clamping element connectors to selectably alter a clamping profile created by the clamping head.

The provision of an attachment having replaceable clamping elements allows for differently shaped objects to be readily lifted by a single attachment, drastically reducing the outlay required for bespoke clamping units.

BRIEF DESCRIPTION OF THE DRAWINGS

The invention will now be more particularly described, by way of example only, with reference to the accompanying drawings, in which.

DETAILED DESCRIPTION

Figure 1:
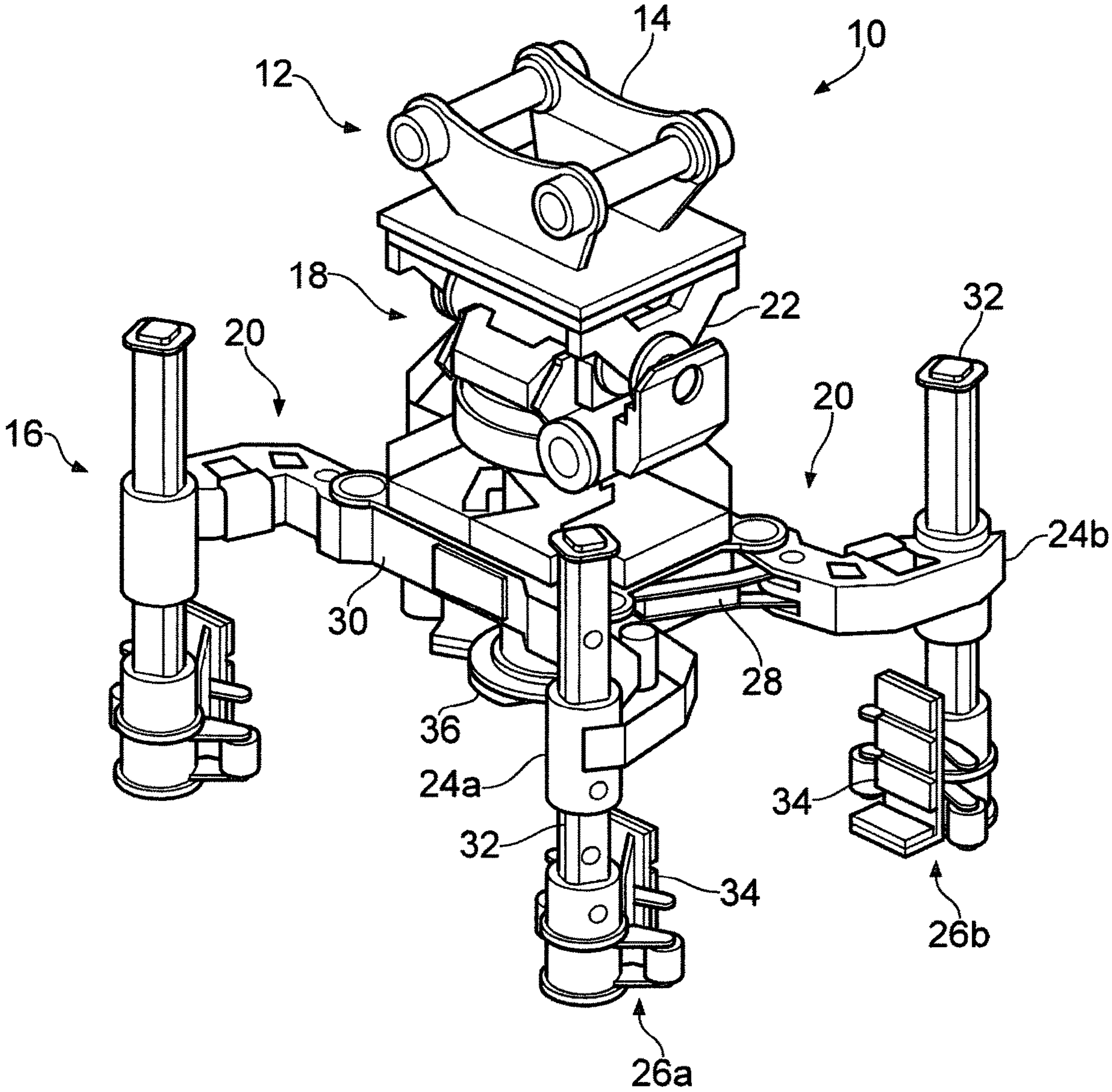
FIG. 1 shows an isometric representation of one embodiment of an articulable lifting attachment for a mechanical articulated arm in accordance with the first aspect of the invention.
Figure 2:
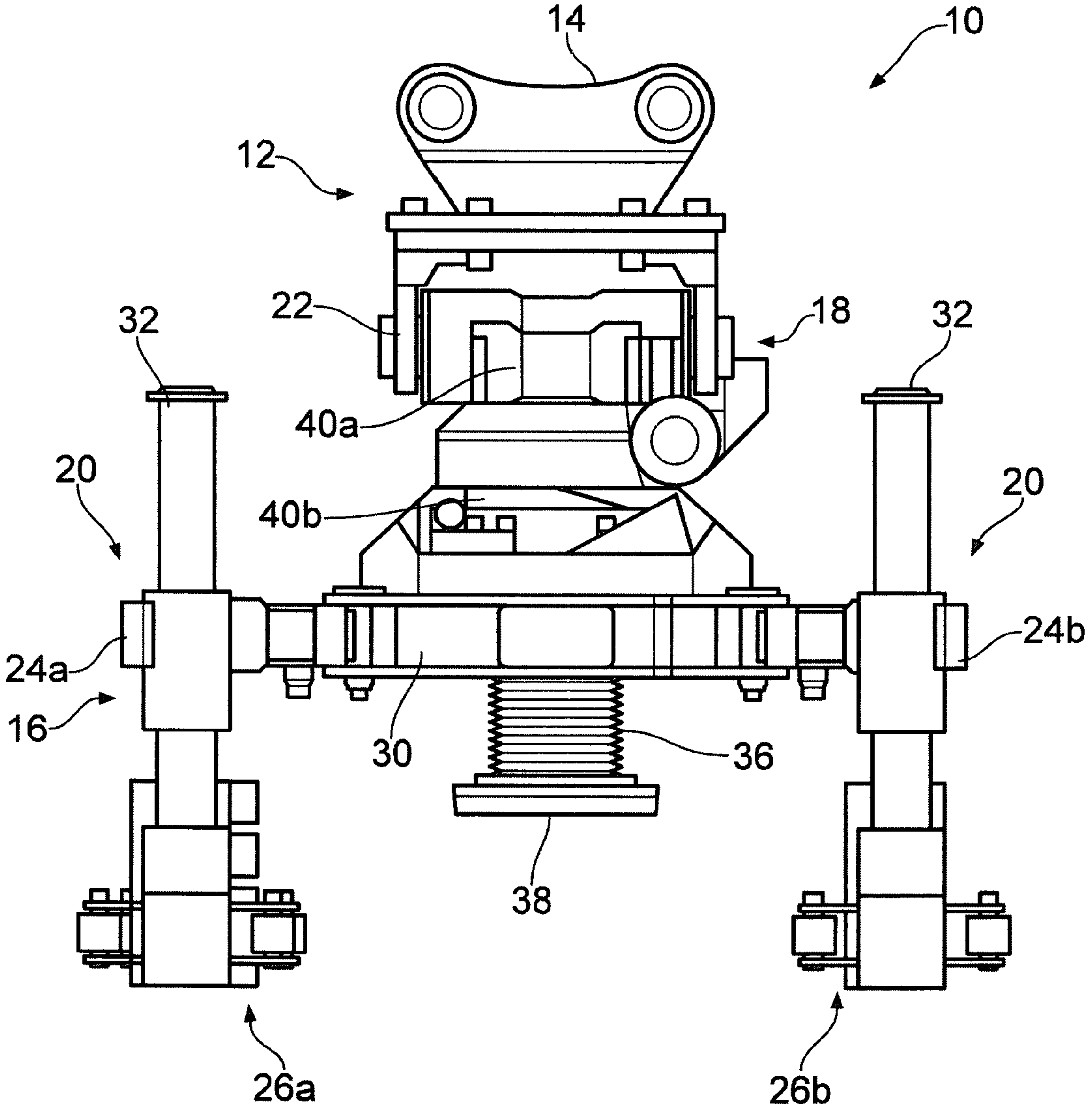
FIG. 2 is a front view of the articulable lifting attachment of FIG. 1.

Referring to FIGS. 1 and 2, there is shown an articulable lifting attachment, referenced globally at 10, and which is suitable for engagement with a mechanical articulated arm to allow for the hoisting, lifting or manipulation of heavy or unwieldy objects, most commonly in the construction industry.

The articulable lifting attachment 10 comprises three sections. These are an attachment body 12 which includes a mechanical-articulated-arm connector 14 via which the articulable lifting attachment 10 is engagable with a mechanical articulated arm, a clamping head 16 which is engagable with an object to be lifted, and a drivable articulator coupling 18 which interconnects the attachment body 12 and the clamping head 16. The drivable articulator coupling 18 permits a wide range of motion of the clamping head 16 with respect to the attachment body 12.

The attachment body 12 is preferably formed as a frame having a pivotable connector 22 at an opposite end to the mechanical-articulated-arm connector 14, which is preferably formed as a hitch or similar connector which can be readily coupled to a mechanical articulated arm.

The clamping head 16 comprises primary and secondary clamping elements which respectively grasp and secure an object engaged with the clamping head 16. In the depicted arrangement, the primary clamping element comprises two pairs of clamping jaws 20, which are preferably independently operable of one another.

Each pair of clamping jaws 20 preferably comprises first and second movable arms 24*a*, 24*b*, though it will be appreciated that it may be possible to provide a movable arm and a stationary arm in order to achieve a requisite relative motion therebetween. Each of the first and second movable arms 24*a*, 24*b* is connected to a corresponding first and second clamp portion 26*a*, 26*b*, which define contact surfaces with the object to be lifted.

The movable arms 24*a*, 24*b* are here formed as arcuate members having an intermediate linkage 28 to ensure consistent relative motion therebetween, and are preferably pivotably engaged with a body 30 of the clamping head 16. Preferably, first and second pivots are provided respectively for the first and second movable arms 24*a*, 24*b* which are spaced apart from one another. Other shapes of movable arm could, of course, be considered, depending on the type of object to be lifted.

At a distal end of each movable arm 24*a*, 24*b* is preferably provided an elongate strut 32, to which the first and second clamp portions 26*a*, 26*b* are attached so as to be offset relative to a jaw-operation plane in which the movable arms 24*a*, 24*b* are operable. The elongate struts 32 may be adjustable and/or extendible to permit alteration of a separation of the first and second clamp portions 26*a*, 26*b* relative to the jaw-operation plane and/or the body 30 of the clamping head 16. In this arrangement, the vertical position of the elongate struts 32 is mechanically adjustable using a fastening pin which can interengage the elongate strut 32 to a corresponding movable arm 24*a*, 24*b*

Whilst adjustability of the positioning of the first and second clamp portions 26*a*, 26*b* with respect to the drivable articulator coupling 18 is described as being achievable by modification of the elongate struts 32, it will be appreciated that the entire clamping head 16 could be actuated relative to the drivable articulator coupling 18, or the movable arms 24*a*, 24*b* could be actuated in some manner.

The first and second clamp portions 26*a*, 26*b* are preferably formed so as to be rotatable relative to the movable arms 24*a*, 24*b*, and at least one of which may therefore be formed as a rotatable clamping pad 34. Preferably, the range of rotation for each clamping pad 34 is limited to less than 180°, such that the clamping surfaces can never face completely away from one another.

The secondary clamping element is capable of being activated to provide a retaining force when engaged with the object to be lifted, and which operates in a different direction to the clamping force applied by the clamping jaws 20, and here this is provided as a drivable ram 36, as best illustrated in FIG. 2. The drivable ram 36 is preferably provided as a linear ram positioned centrally on the body 30 of the clamping head 16, equidistant between the two pairs of clamping jaws 20.

The drivable ram 36 here includes a contact pad 38 mounted at a distal end thereof, and the contact pad 38 is itself preferably mounted to the distal end of the drivable ram 36 via a hemispherical bearing. This allows for the contact pad 38 to adjust its alignment to the object to be lifted, and/or may allow different types of contact pad 38 to be interchanged according to the shape of the object.

Each of the primary and secondary clamping elements is preferably hydraulically activatable, with a hydraulic input being receivable from the mechanical articulated arm to which the articulable lifting attachment 10 is to be attached. In this arrangement, each of the two clamping jaws 20 is in communication with a separate hydraulic cylinder which drives the relative motion of the first and second movable arms 24*a*, 24*b*. The drivable ram 36 also preferably has its own dedicated hydraulic cylinder.

The drivable articulator coupling 18 preferably has two modes of motion: an axial rotation capable of altering a relative angle between the attachment body 12 and the clamping head 16, and a tilting motion to change a tilt angle between the attachment body 12 and the clamping head 16. As such, the drivable articulator coupling 18 requires at least two movable body portions 40*a*, 40*b*.

The first movable body portion 40*a* is engagable with the pivotable connector 22 of the attachment body 12, and may include a dedicated motor which enables the tilt between the first movable body portion 40*a* and the attachment body 12 to be held indefinitely at any given tilt angle during the lifting of the object.

The second movable body portion 40*b* is engaged with the clamping head 16, and is rotatably connected to the first movable body portion 40*a* to thereby permit rotation of the clamping head 16 with respect to the attachment body 12.

It is preferred that there are two control circuits for the hydraulics of the articulable lifting attachment 10: the first control circuit can be used to control the tilt and clamping functions of the articulable lifting attachment 10, and changeover may be achieved by using a changeover valve, such as an electronically controlled spool valve; the second circuit may then be used to solely control the rotation of the clamping head 16. This arrangement prevents the tilt and clamping functions from being activated simultaneously.

Figure 3B:
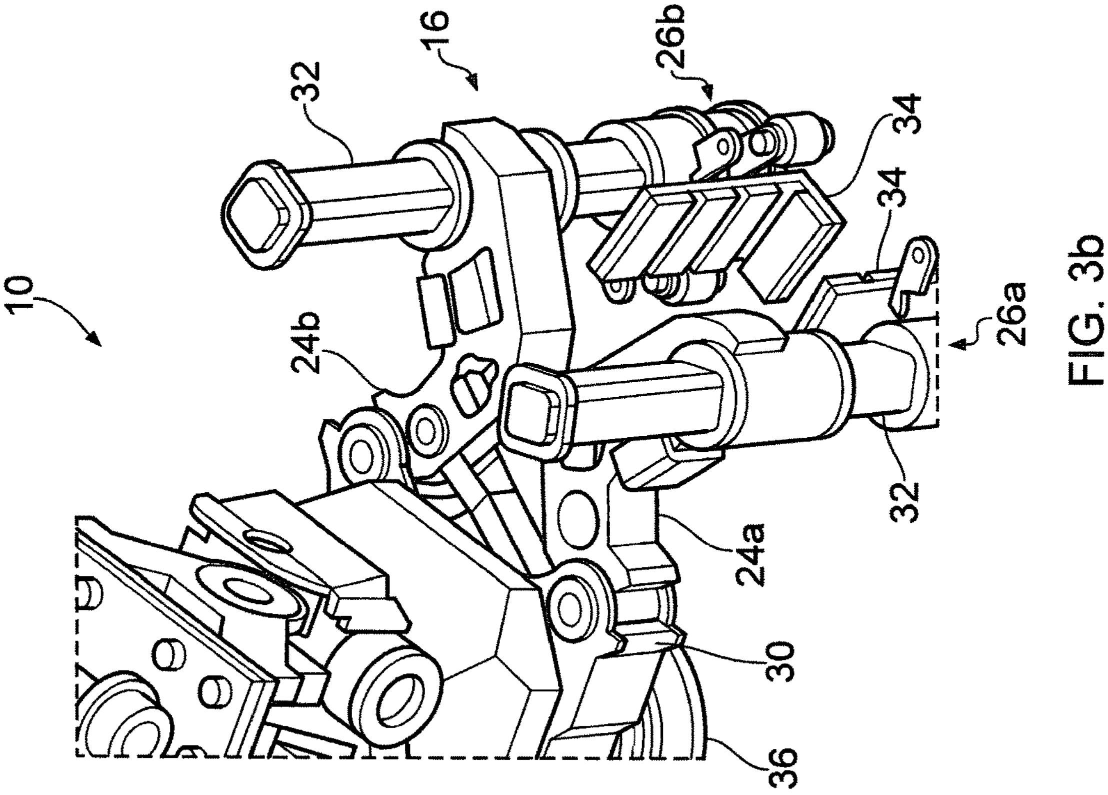
FIG. 3*b* shows the pair of clamping jaws of FIG. 3*a* in a second, closed condition.
Figure 3A:
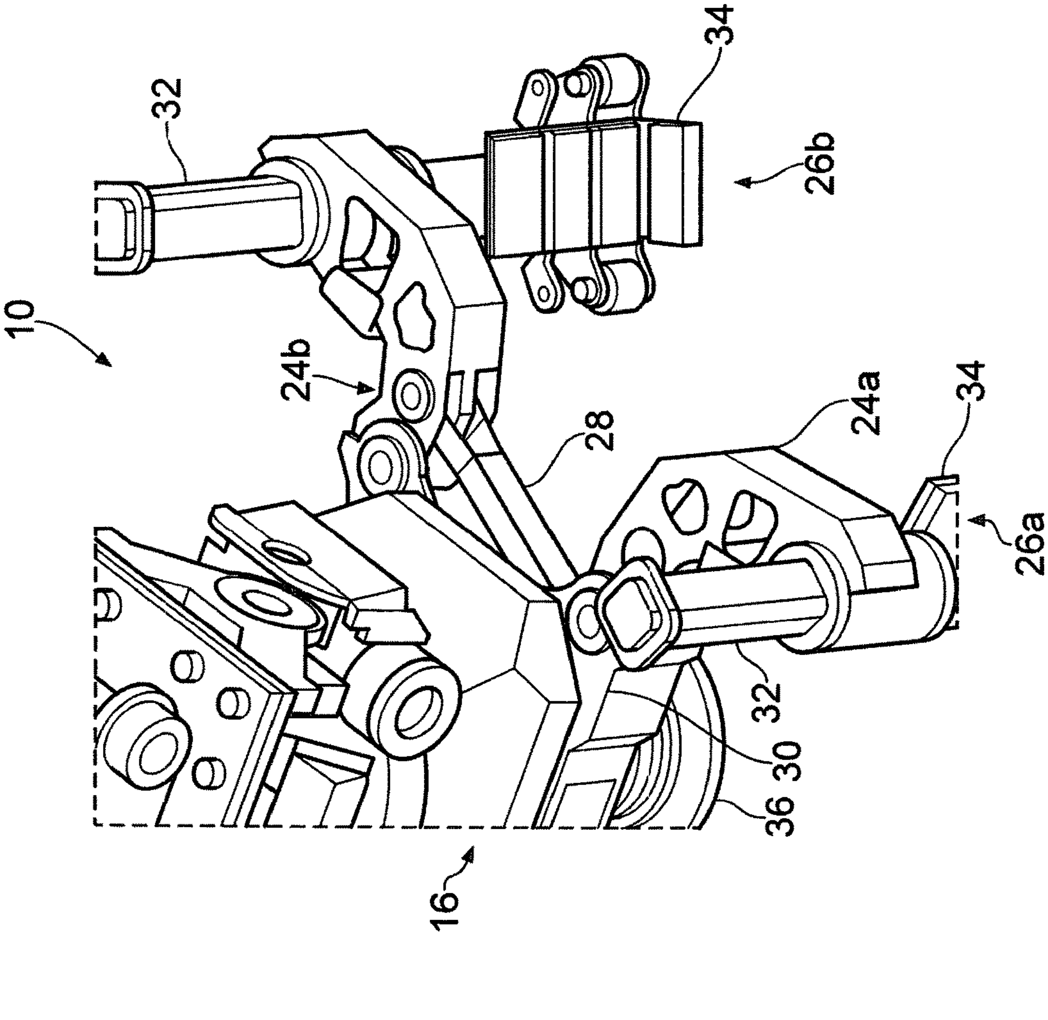
FIG. 3*a* shows an enlarged view of one pair of clamping jaws of the articulable lifting attachment of FIG. 1 in a first, open condition.

The range of motion of the clamping jaws 20 is illustrated in FIGS. 3*a* and 3*b*. In a first, open condition, as shown in FIG. 3*a*, the movable arms 24*a*, 24*b* are pivoted outwardly, and the arcuate shapes thereof create a wide maximum separation between the first and second clamp portions 26*a*, 26*b*. The clamping pads 34 are here formed as L-shaped pads, mounted to the elongate strut 32 via a preferably cylindrical collar 42, and which is suitable for engagement with cuboidal or substantially cuboidal objects, such as steel beams. In other words, the rotatable clamping pad 34 comprises a support portion 44 aligned to an axis of rotation of the rotatable clamping pad 34, and by extension of the elongate strut 32 to which the rotatable clamping pad 34 is mounted, and a gripping portion 46 which is at an angle relative to the support portion 44, which in this instance, is formed as a perpendicular lip or projection which can grip under an object to be lifted.

Preferably, a contact surface of the rotatable clamping pads 34 is formed from a material having a higher coefficient of friction than the first and second movable arms 24*a*, 24*b*, which would typically be made from a metal such as steel. In this instance, the contact surface is formed as a plurality of resilient pads, for example, formed from rubber.

Positioned laterally either side of each rotatable clamping pad 34 is provided a roller element 48 which is also attached to the collar 42, and as such, rotates in tandem with the rotatable clamping pad 34. The roller elements 48 are able to contact with the object to be lifted and aligned the contact surface of the clamping pads 34 to a surface of the object in use.

A second, closed condition of the clamping jaws 20 is shown in FIG. 3*b*. The movable arms 24*a*, 24*b* have been driven towards one another, pivoting the rotatable clamping pads 34 thereon towards one another.

If an object were aligned between the clamping jaws 20 in the first, open condition, then the hydraulic cylinder can be activated to clamp the clamping jaws 20 into the second, closed condition. As the first and second clamp portions 26*a*, 26*b* are brought into contact with an outer surface of the object, a clamping force will be applied thereto, based on the hydraulic pressure applied.

Figure 4:
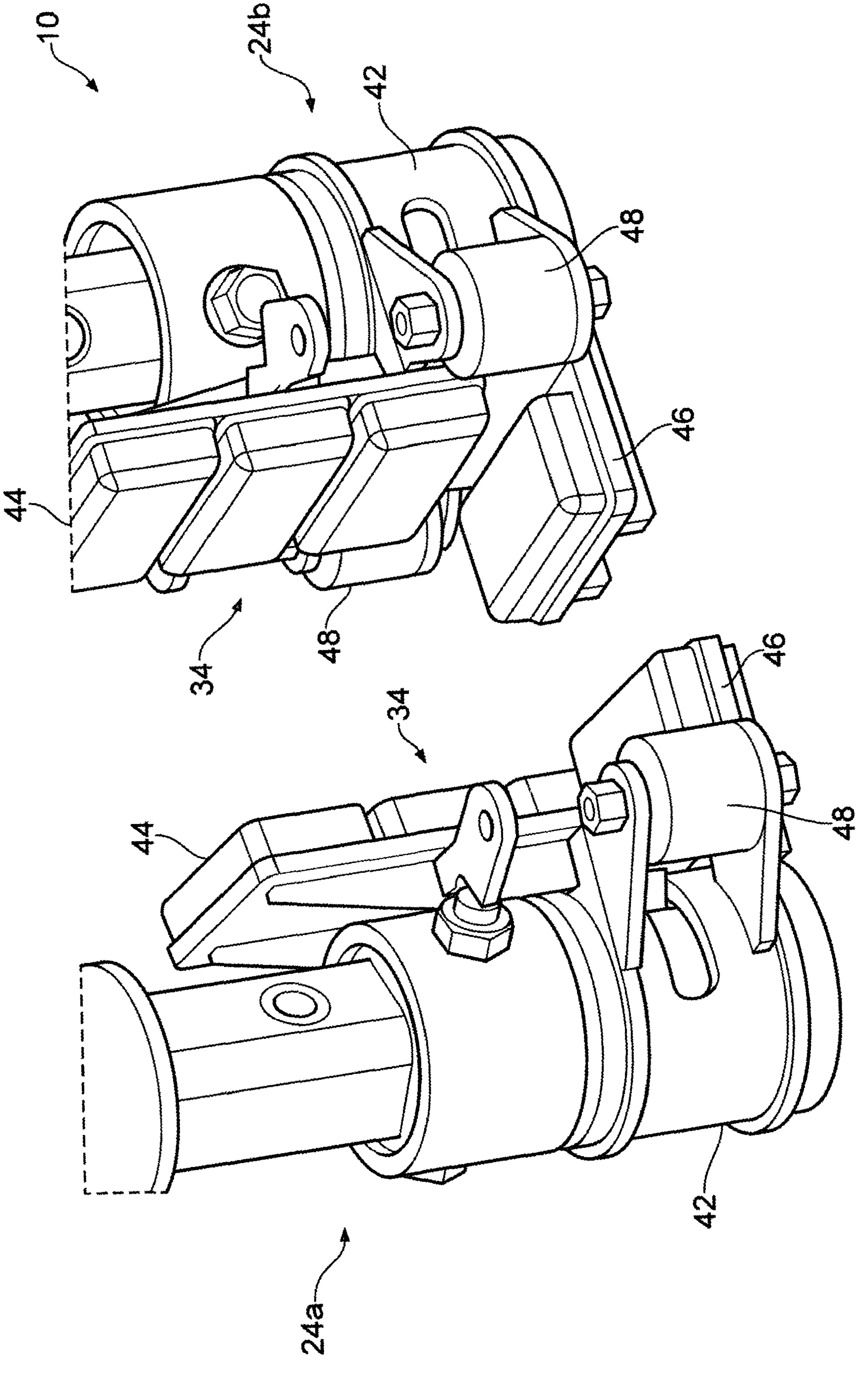
FIG. 4 shows an enlarged representation of the first and second clamp portions of the articulable lifting attachment of FIG. 1.

If the contact surface of the clamping pads 34 contact the object first, then clamping will occur naturally. However, if the clamping pads 34 have misaligned relative to the outer surface of the object, then one or other roller element 48 will contact the outer surface first, and the driving of the movable arms 24*a*, 24*b* will naturally urge the rotatable clamping pad 34 to align to the outer surface of the object without jamming. A correctly aligned configuration of the rotatable clamping pads 34 can be seen in FIG. 4, for a cuboidal object.

Figure 5:
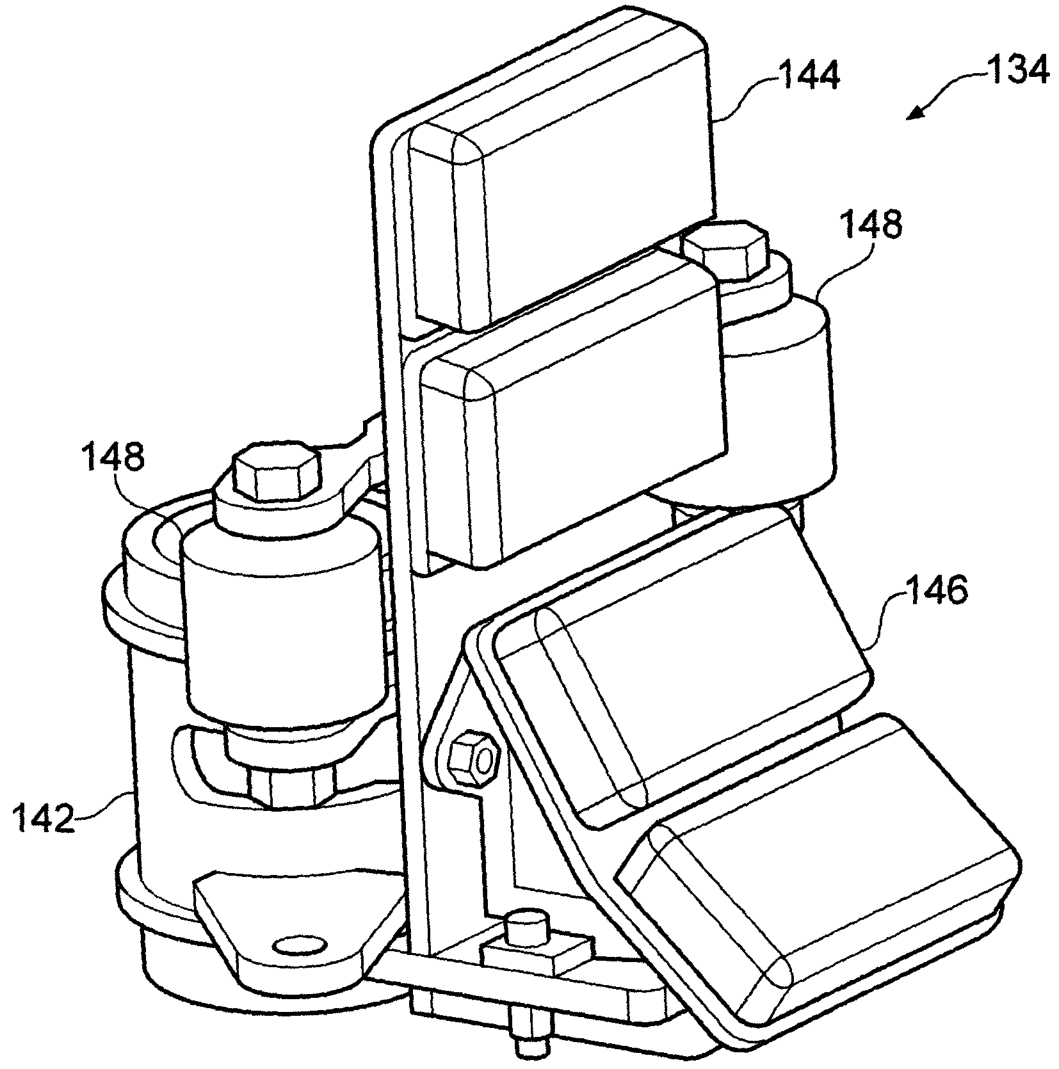
FIG. 5 shows an isometric representation of an alternative embodiment of clamp portion for use with the articulable lifting attachment of FIG. 1.

It is preferred that the first and second clamping portions 26*a*, 26*b* be releasable from the first and second movable arms 24*a*, 24*b*, to thereby allow different clamping arrangements to be utilised. One such alternative rotatable clamping pad 134 is indicated in FIG. 5. In this alternative embodiment, similar or identical reference numerals will be utilised to refer to similar or identical components to those described above, and further detailed description will be omitted for brevity.

The rotatable clamping pad 134 is engaged with a collar 142 which can be releasably attached to an elongate strut 32, and roller elements 148 are attached thereto. However, the form of the rotatable clamping pad 134 is different, in that there is a support portion 144 aligned to an axis of rotation of the rotatable clamping pad 134 to which the rotatable clamping pad 134 is mounted, and a gripping portion 146 which is at an acute angle, or is curved, relative to the support portion 144. Such a gripping portion 146 is well-suited to clamping curved or cylindrical objects, such as concrete pipes. A clamping head having such rotatable clamping pads 134 advantageously forms a relatively parabolic or semi-circular grasping region.

Any appropriate shape of contact surface could feasibly be incorporated into a clamping portion, and could be interchanged with other clamping portions to alter the type of object which can be lifted.

Additionally, it may be possible to remove the roller elements completely, for example, replacing the clamping pads with a rotatable clamping portion which is able to self-align to the outer surface of the object to be lifted.

The primary clamping element defines only the first clamping force of the clamping head 16, and it is the secondary clamping element which provides the additional security to permit an object to be safely lifted. The operation of the full clamping head is illustrated in FIGS. 6*a* and 6*b*.

The articulable lifting attachment 10 can be attached to a mechanical articulated arm 50 via the mechanical-articulated-arm connector 14, and this may allow a hydraulic input into the articulable lifting attachment 10 to be achieved, whilst also providing a mechanism for physically lifting the articulable lifting attachment 10 from the ground.

Figure 6A:
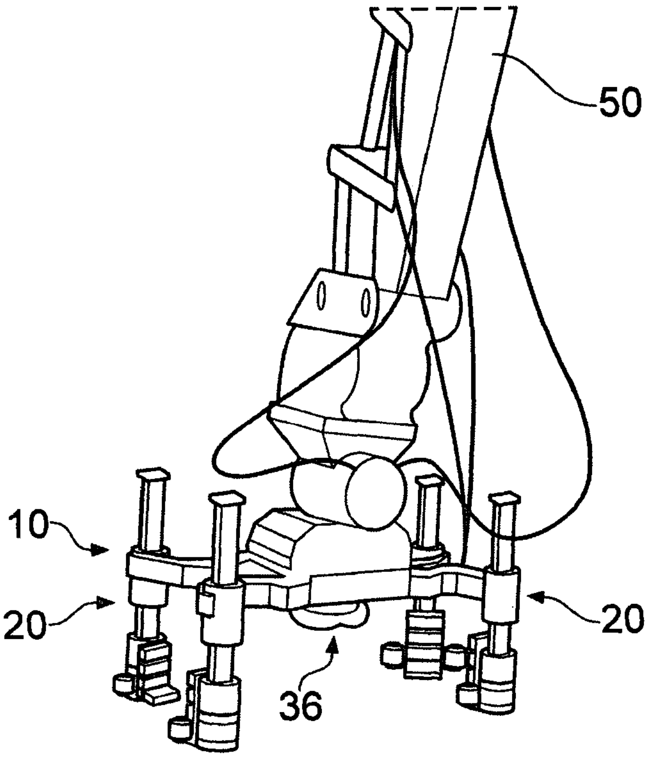
FIG. 6*a* shows a representation of the articulable lifting attachment of FIG. 1 engaged with a mechanical articulated arm, the clamping head being in a first, open condition.
Figure 6B:
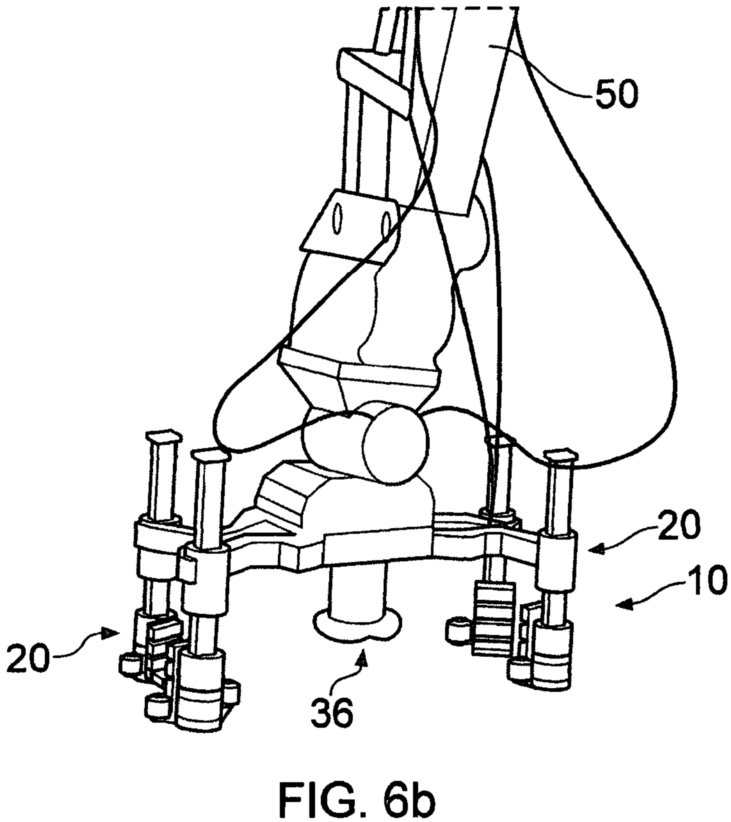
FIG. 6*b* shows the articulable lifting attachment of FIG. 6*a* in a second, closed condition.

FIG. 6*a* shows the first, open condition of the articulable lifting attachment 10. The clamping jaws 20 are open such that the first and second clamping portions 26*a*, 26*b* are relatively spaced apart, and the drivable ram 36 is retracted relative to the body 30 of the clamping head 16.

Under hydraulic activation, each of the hydraulic cylinders in the hydraulic system of the articulable lifting attachment 10 will activate, respectively closing the clamping jaws 20 and extending the drivable ram 36 so as to assume the second, closed condition.

The closure of the clamping jaws 20 is detailed above; however, the extension of the drivable ram 36 will operate in a different direction to apply a different clamping force to the object to be lifted. In this instance, the drivable ram 36 operates along an axial direction of the drivable articulator coupling 18, which is perpendicular to the jaw-engagement plane and the direction of clamping of the clamping jaws 20. The drivable ram 36 will extend until it contacts the outer surface of the object to be lifted, and the contact pad 38 will naturally position itself thereon having been manoeuvred via the hemispherical bearing. A clamping force will be applied based on the hydraulic pressure in the corresponding hydraulic cylinder. In the present arrangement, this results in a strong clamp, having five points of contact with the object to be lifted; four from the clamping jaws 20, and one from the ram 36.

Figure 7:
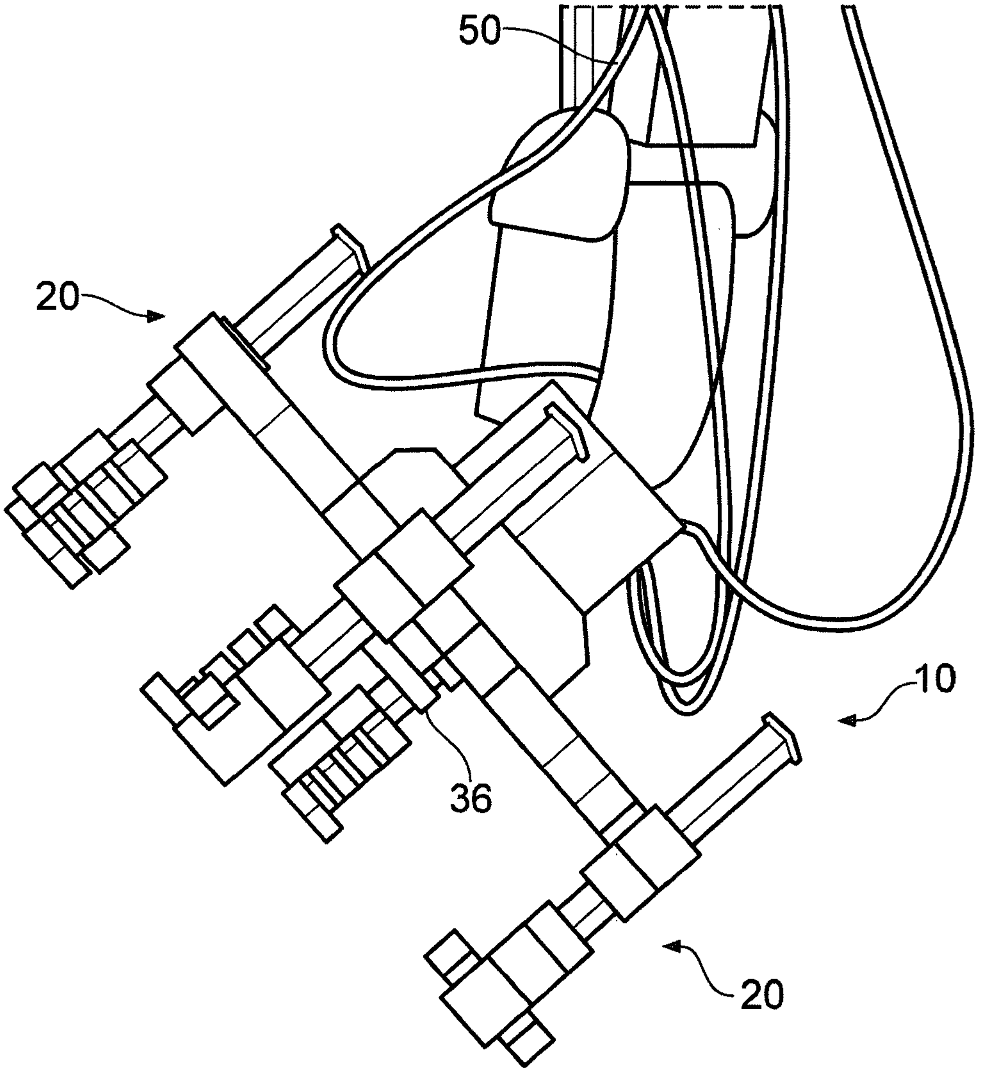
FIG. 7 shows the articulable lifting attachment of FIG. 6*a* following a tilting and rotation actuation of the drivable articulator coupling thereof.

When attached to a mechanical articulated arm 50, the articulable lifting attachment 10 can be articulated independently of an articulation of the mechanical articulated arm 50 via the drivable articulator coupling 18, as is illustrated in FIG. 7. A tilt and rotation of the clamping head 16 have both been effected in this instance, relative to the arrangements shown in FIGS. 6*a* and 6*b*. A full range of motion can therefore be achieved for a lifted object, using these controls.

Figure 8:
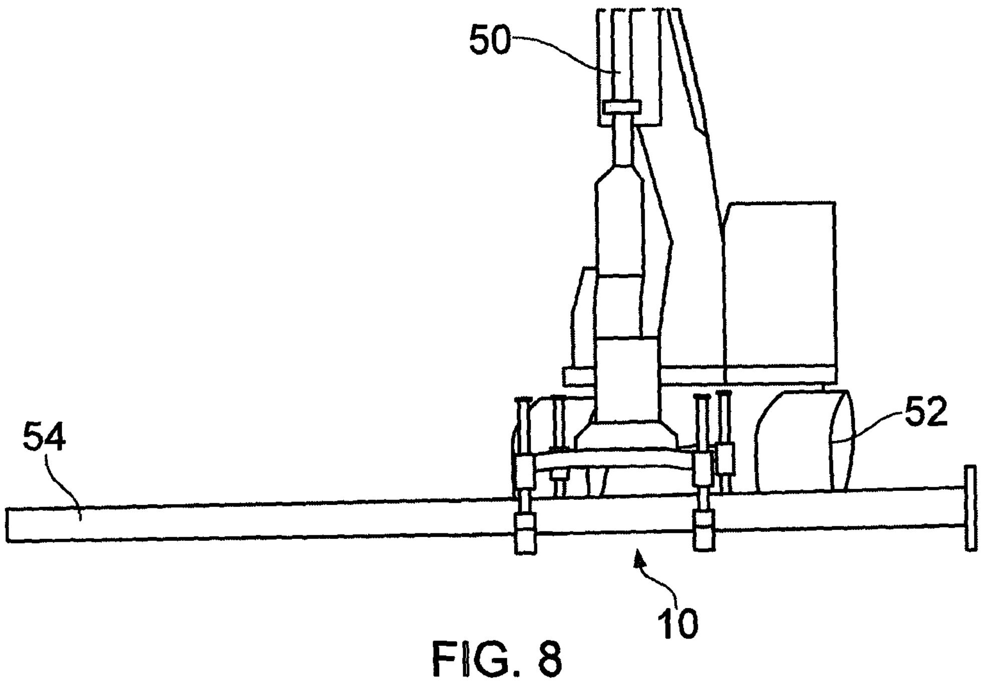
FIG. 8 shows a representation of a mechanised vehicle having a mechanical articulated arm with the articulable lifting attachment engaged therewith, the articulable lifting attachment clamping a steel beam on the ground.

The grasping of an object is shown in FIG. 8, in which the articulable lifting attachment 10, connected to the mechanical articulated arm 50 of a mechanised vehicle 52 is indicated grasping a steel beam 54. The articulable lifting attachment 10 can be brought towards the steel beam in the first, open condition, with the hydraulic system activating to bring the clamping head 16 into the second, closed condition once the clamping head 16 has been correctly positioned.

The rotatable clamping pads 34 will here contact side surfaces of the steel beam 54, with the gripping portions 46 engaging with a lower surface thereof. The drivable ram 36 can engage with an upper surface of the steel beam 54, with the clamping force acting against the gripping portions 46 to strongly hold the steel beam 54 therein. In this instance, it is preferred that the hydraulic configuration be such that the clamping jaws 20 activate prior to, or more quickly than, the drivable ram 36, to thereby ensure that the gripping portions 46 are correctly aligned before the secondary clamping force is applied. This may be achieved by careful selection of hydraulic pressures within the system, or control circuitry could be used to provide stepwise activation of the various hydraulic cylinders.

Figure 9:
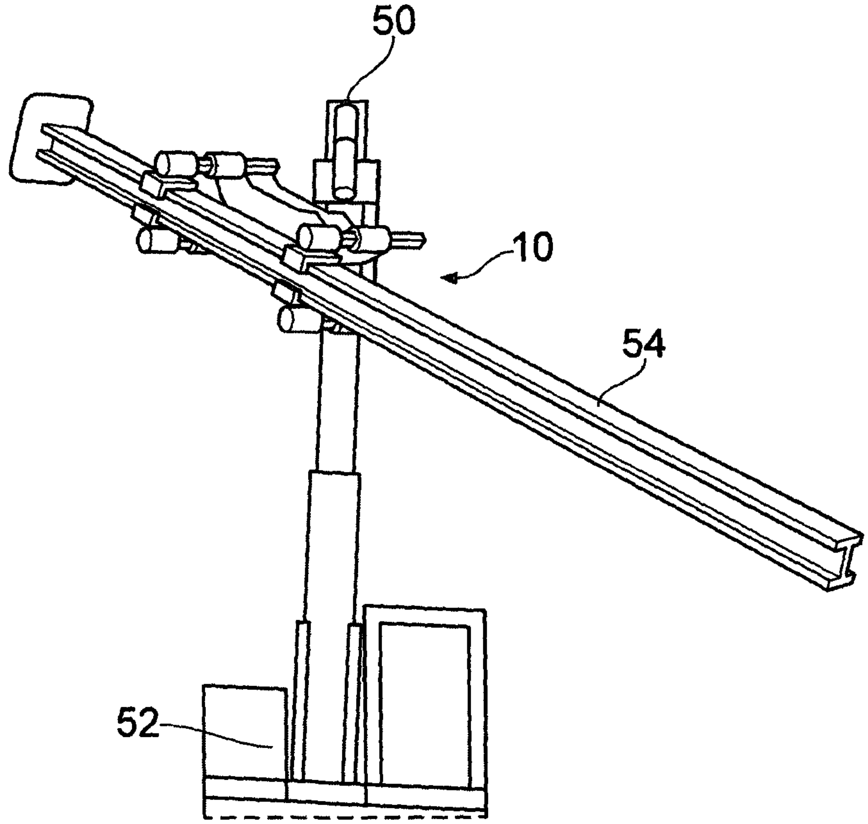
FIG. 9 shows the mechanised vehicle of FIG. 8 following lifting of the steel beam.

The lifted steel beam 54 is indicated in FIG. 9, which shows how articulation of the steel beam 54 can be readily achieved using the articulable lifting attachment 10.

Whilst the above clamping head has been described having two pairs of clamping jaws, it may be possible to provide only one pair of jaws, with additional support being provided to the object by a static element, such as a retaining loop, stirrup or strap, or similar structural member upon which the object may partially rest. The secondary clamping element may then provide the necessary clamping force to hold the object in position against the static element. Furthermore, it may be possible, in some configurations, to provide primary and secondary clamping elements, neither of which are formed as jaws. For example, the primary clamping element could comprise a cradle portion, which is clamped in position by the secondary clamping element. It is therefore not strictly necessary that each of the primary and secondary clamping elements provide a clamping force in their own right. Instead, the combination of the primary and secondary clamping elements could together create a combined clamping force.

Whilst it is possible to provide an articulable lifting attachment which has both primary and secondary clamping elements, it will be appreciated that in some contexts, the secondary clamping element may be removed. The primary clamping element may provide sufficient retention, as is the case in the art at present. The present invention can therefore be utilised as a modular system in which different sets of clamping pads or similar elements can be provided to improve the utility of a single attachment. Such an articulable lifting attachment may comprise an attachment body having a mechanical-articulated-arm connector, a clamping head having a plurality of clamping element connectors, a drivable articulator coupling interposed between the attachment body and the clamping head to permit relative articulation between the attachment body and the clamping head; and a plurality of sets of clamping elements, wherein each set of clamping element is releasably engagable with the plurality of clamping element connectors to selectably alter a clamping profile created by the clamping head.

It is therefore possible to provide an articulable lifting attachment for, preferably demountable, engagement with a mechanical articulated arm. The articulable lifting attachment comprises an attachment body, a clamping head and a drivable articulator coupling interposed between the attachment body and the clamping head. The clamping head is configured to provide two different clamping forces from different directions to ensure that irregular objects can be lifted safely. Different types of object can also be grasped by providing interchangeable clamping elements, thereby reducing the need to provide lots of different types of attachment for different purposes. Objects could include cuboidal objects, trapezoidally-shaped objects, cylindrical objects, ovoid objects, triangularly-shaped objects, as well as non-standard geometric objects.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. An articulable lifting attachment for a mechanical articulated arm, the articulable lifting attachment comprising:

an attachment body having a mechanical-articulated-arm connector;

a clamping head having a primary clamping element and a secondary clamping element, the primary clamping element comprising a pair of clamping jaws for applying a first clamping force to an object to be lifted, the secondary clamping element being activatable to apply a second clamping force in a different direction relative to the first clamping force; and a drivable articulator coupling interposed between the attachment body and the clamping head to permit relative articulation between the attachment body and the clamping head;

wherein the pair of clamping jaws comprises a first arm having a first clamp portion and a second arm having a second clamp portion, the first and second clamp portions being actuatable relative to one another;

wherein at least one of the first and second clamp portions comprises a rotatable clamping pad comprising a support portion aligned to an axis of rotation of the rotatable clamping pad and a gripping portion which is an angle relative to the support portion; and wherein each rotatable clamping pad is attached to a respective first or second arm via an elongate member about which the rotatable clamping pad is rotatable.

2. An articulable lifting attachment as claimed in claim 1, wherein at least one of the first and second arms is pivotably actuatable to effect the relative actuation of the first and second clamp portions.

3. An articulable lifting attachment as claimed in claim 1, further comprising a roller element at or adjacent to the rotatable clamping pad for aligning the clamping pad relative to the object to be lifted.

4. An articulable lifting attachment as claimed in claim 1, wherein a separation between each of the first and second clamp portions and the drivable articulator coupling is adjustable.

5. An articulable lifting attachment as claimed in claim 1, wherein the first and second clamp portions comprise a contact surface formed from a material having a higher coefficient of friction than the first and second arms.

6. An articulable lifting attachment as claimed in claim 1, wherein at least one of the first and second clamp portions is releasably engagable with the respective first and/or second arm.

7. An articulable lifting attachment as claimed in claim 1, wherein two said pairs of clamping jaws are provided.

8. An articulable lifting attachment as claimed in claim 7, wherein the two pairs of clamping jaws are independently operable.

9. An articulable lifting attachment as claimed in claim 7, wherein the secondary clamping element is configured to apply the clamping force in a direction perpendicular to a jaw-operation plane of the two pairs of clamping jaws.

10. An articulable lifting attachment as claimed in claim 7, wherein the clamping head provides five points of contact with the object to be lifted, the two pairs of clamping jaws providing four of the points of contact, and the secondary clamping element providing a further point of contact.

11. An articulable lifting attachment as claimed in claim 1, wherein the secondary clamping element is provided as a drivable ram.

12. An articulable lifting attachment as claimed in claim 11, wherein the secondary clamping element comprises a contact pad mounted at a distal end of the drivable ram.

13. An articulable lifting attachment as claimed in claim 1, wherein the drivable articulator coupling comprises an axial rotational connector engaged with the clamping head.

14. An articulable lifting attachment as claimed in claim 1, wherein the drivable articulator coupling comprises a tiltable connector engaged with the attachment body.

15. An articulable lifting attachment for a mechanical articulated arm, the articulable lifting attachment comprising:

an attachment body having a mechanical-articulated-arm connector;

a clamping head having a plurality of clamping element connectors;

a drivable articulator coupling interposed between the attachment body and the clamping head to permit relative articulation between the attachment body and the clamping head; and a plurality of sets of clamping elements, wherein each set of clamping elements is releasably engagable with the plurality of clamping element connectors to selectably alter a clamping profile created by the clamping head.

16. An articulable lifting attachment for a mechanical articulated arm, the articulable lifting attachment comprising:

an attachment body having a mechanical-articulated-arm connector;

a clamping head having a primary clamping element and a secondary clamping element, the primary clamping element comprising a pair of clamping jaws for applying a first clamping force to an object to be lifted, the secondary clamping element being activatable to apply a second clamping force in a different direction relative to the first clamping force; and a drivable articulator coupling interposed between the attachment body and the clamping head to permit relative articulation between the attachment body and the clamping head;

wherein two said pairs of clamping jaws are provided; and wherein the clamping head provides five points of contact with the object to be lifted, the two pairs of clamping jaws providing four of the points of contact and the secondary clamping element providing a further point of contact.

* * * * *